(12) United States Patent
Thomas et al.

(10) Patent No.: US 11,961,253 B2
(45) Date of Patent: Apr. 16, 2024

(54) DETERMINING MATERIAL VOLUME AND DENSITY BASED ON SENSOR DATA

(71) Applicant: Caterpillar SARL, Geneva (CH)

(72) Inventors: Philip J. Thomas, Princeville, IL (US); Jacob C. Maley, Germantown Hills, IL (US)

(73) Assignee: Caterpillar SARL, Geneva (CH)

( * ) Notice: Subject to any disclaimer, the term of this patent is extended or adjusted under 35 U.S.C. 154(b) by 701 days.

(21) Appl. No.: 16/949,346

(22) Filed: Oct. 26, 2020

(65) Prior Publication Data
US 2022/0130063 A1    Apr. 28, 2022

(51) Int. Cl.
*G06T 7/62* (2017.01)
*E02F 9/26* (2006.01)
*G01F 22/00* (2006.01)
*G01G 19/08* (2006.01)
*G01N 9/02* (2006.01)
(Continued)

(52) U.S. Cl.
CPC ............... *G06T 7/62* (2017.01); *E02F 9/261* (2013.01); *E02F 9/264* (2013.01); *G01F 22/00* (2013.01); *G01G 19/08* (2013.01); *G01N 9/02* (2013.01); *G01S 17/89* (2013.01); *G06T 7/593* (2017.01); *G06T 7/70* (2017.01); *G06V 20/56* (2022.01); *E02F 3/32* (2013.01); *G06T 2207/10012* (2013.01); *G06T 2207/30252* (2013.01)

(58) Field of Classification Search
CPC . E02F 3/32; E02F 9/2029; E02F 9/261; E02F 9/264; G01F 22/00; G01G 19/08; G01N 9/02; G01S 17/89; G06T 2207/10012; G06T 2207/30252; G06T 7/593; G06T 7/62; G06T 7/70; G06V 20/56
See application file for complete search history.

(56) References Cited

U.S. PATENT DOCUMENTS 10,234,368 B2 * 3/2019 Cherney .................. G01N 9/02
10,662,613 B2    5/2020 Ready-Campbell et al.
(Continued)

FOREIGN PATENT DOCUMENTS

JP        2020020154 A      2/2020

OTHER PUBLICATIONS

Written Opinion and International Search Report for Int'l. Patent Appln. No. PCT/US2021/025410, dated Feb. 22, 2022 (16 pgs).

*Primary Examiner* — Tyler J Lee (57) ABSTRACT

A controller may receive information identifying an area of interest from a plurality of candidate areas of interest including locations on the machine and external to the machine. The controller may obtain, using the one or more first sensor devices, data identifying material located at the area of interest; and generate a graphical representation based on the data. The controller may determine, using the one or more second sensor devices, at least one of a position or an orientation of one or more portions of the machine; and identify a portion of the graphical representation based on the at least one of the position or the orientation of the one or more portions. The portion may correspond to the material located at the area of interest. The controller may determine, using one or more computational models, a volume of the material based on the portion of the graphical representation.

20 Claims, 3 Drawing Sheets

(51) Int. Cl.

| | |
|---|---|
| *G01S 17/89* | (2020.01) |
| *G06T 7/593* | (2017.01) |
| *G06T 7/70* | (2017.01) |
| *G06V 20/56* | (2022.01) |
| *E02F 3/32* | (2006.01) |

(56) References Cited

U.S. PATENT DOCUMENTS

| | | |
|---|---|---|
| 10,689,830 B2 | 6/2020 | Hageman et al. |
| 2018/0106709 A1* | 4/2018 | Cherney ............... B60P 1/00 |
| 2018/0179732 A1 | 6/2018 | Bartsch |
| 2018/0245308 A1 | 8/2018 | Ready-Campbell et al. |
| 2018/0245317 A1 | 8/2018 | Ready-Campbell |
| 2019/0026914 A1 | 1/2019 | Hageman et al. |
| 2019/0301138 A1 | 10/2019 | Sherlock et al. |
| 2020/0087893 A1 | 3/2020 | Hageman et al. |
| 2020/0392703 A1* | 12/2020 | Sherlock ............... G07C 5/02 |
| 2022/0195690 A1* | 6/2022 | Wu ..................... E02F 3/439 |

\* cited by examiner

DETERMINING MATERIAL VOLUME AND DENSITY BASED ON SENSOR DATA

TECHNICAL FIELD

The present disclosure relates generally to a controller and, for example, to a controller for determining the volume and the density of material moved by a machine.

BACKGROUND

An excavator may load material into a dump truck while the dump truck is positioned at a location at which a bucket of the excavator can dump material into a truck bed of the dump truck. The excavator may perform one or more passes in order to load the material into the truck bed. An individual (e.g., an operator of the excavator and/or an owner of the excavator) may desire to determine a measure of productivity of the excavator (e.g., during a work shift).

For example, the individual may desire to obtain information regarding a volume of the material and/or a density of the material loaded into the truck bed, a volume of the material and/or a density of the material removed (e.g., from a ground surface) by the bucket, and/or a volume of the material and/or a density of the material in a pile near the excavator. The excavator and the dump truck are unable to provide such information to the individual. Accordingly, the individual may resort to manual measurements of such volumes and/or densities. Obtaining such manual measurements is a time consuming process. Additionally, manual measurements may be inaccurate. The inaccuracy of the manual measurements may result in inaccurate changes and/or adjustments to the excavator (e.g., inaccurate changes and/or adjustments to the configuration of the excavator, inaccurate changes and/or adjustments to the components of the excavator, etc.).

U.S. Patent Application Publication No. 20200087893 (the '893 publication) discloses that a mobile work machine includes a container movably supported by the frame. The '893 publication also discloses that the container is configured to receive contents and an actuator is configured to controllably drive movement of the container relative to the frame. The '893 publication further discloses determining a density, volume or weight of earth in a container of a work machine, such as a bucket of an excavator.

While the '893 publication discloses determining a density, volume or weight of earth in a bucket of an excavator, the '893 publication does not disclose determining a density or a volume of earth in a truck bed of a dump truck and does not disclose determining a density or a volume of earth in a pile near the excavator.

The controller of the present disclosure solves one or more of the problems set forth above and/or other problems in the art.

SUMMARY

In some implementations, a method performed by a controller of a machine includes receiving information identifying an area of interest from a plurality of candidate areas of interest, wherein the plurality of candidate areas of interest include locations on the machine and external to the machine; obtaining, using one or more first sensor devices associated with the machine, images identifying material located at the area of interest; generating a three-dimensional graphical representation based on the images; determining, using one or more second sensor devices of the machine, at least one of a position or an orientation of one or more portions of the machine; determining coordinates of the material at the area of interest with respect to the machine based on the at least one of the position or the orientation of the one or more portions; identifying, based on the coordinates, a portion of the three-dimensional graphical representation, wherein the portion corresponds to the material located at the area of interest; determining, using one or more computational models, a volume of the portion; determining, based on the volume of the portion, a volume of the material; and performing an action based on the volume of the material.

In some implementations, a machine includes one or more memories; and one or more processors configured to: receive information identifying an area of interest from a plurality of candidate areas of interest, wherein the plurality of candidate areas of interest include locations on the machine and external to the machine; obtain, using one or more first sensor devices associated with the machine, data identifying material located at the area of interest; generate a three-dimensional graphical representation of the material based on the data; determine, using one or more second sensor devices of the machine, at least one of a position or an orientation of one or more portions of the machine; identify a portion of the three-dimensional graphical representation based on the at least one of the position or the orientation of the one or more portions, wherein the portion corresponds to the material located at the area of interest; determine, using one or more computational models, a volume of the portion; and determine, based on the volume of the portion, a volume of the material.

In some implementations, a system includes one or more first sensor devices associated with a machine; one or more second sensor devices associated with the machine; and a controller, of the machine, configured to: receive information identifying an area of interest from a plurality of candidate areas of interest, wherein the plurality of candidate areas of interest include locations on the machine and external to the machine; obtain, using the one or more first sensor devices, data identifying material located at the area of interest; generate a graphical representation based on the data; determine, using the one or more second sensor devices, at least one of a position or an orientation of one or more portions of the machine; identify a portion of the graphical representation based on the at least one of the position or the orientation of the one or more portions, wherein the portion corresponds the material located at the area of interest; and determine, using one or more computational models, a volume of the material based on the portion of the graphical representation.

DETAILED DESCRIPTION

This disclosure relates to a controller (of a machine) that determines a volume and/or a density of material located at a plurality of areas of interest (e.g., locations on the machine and external to the machine). The term "machine" may refer to any machine that performs an operation associated with an industry such as, for example, mining, construction, farming, transportation, or another industry. Moreover, one or more implements may be connected to the machine.

Figure 1:
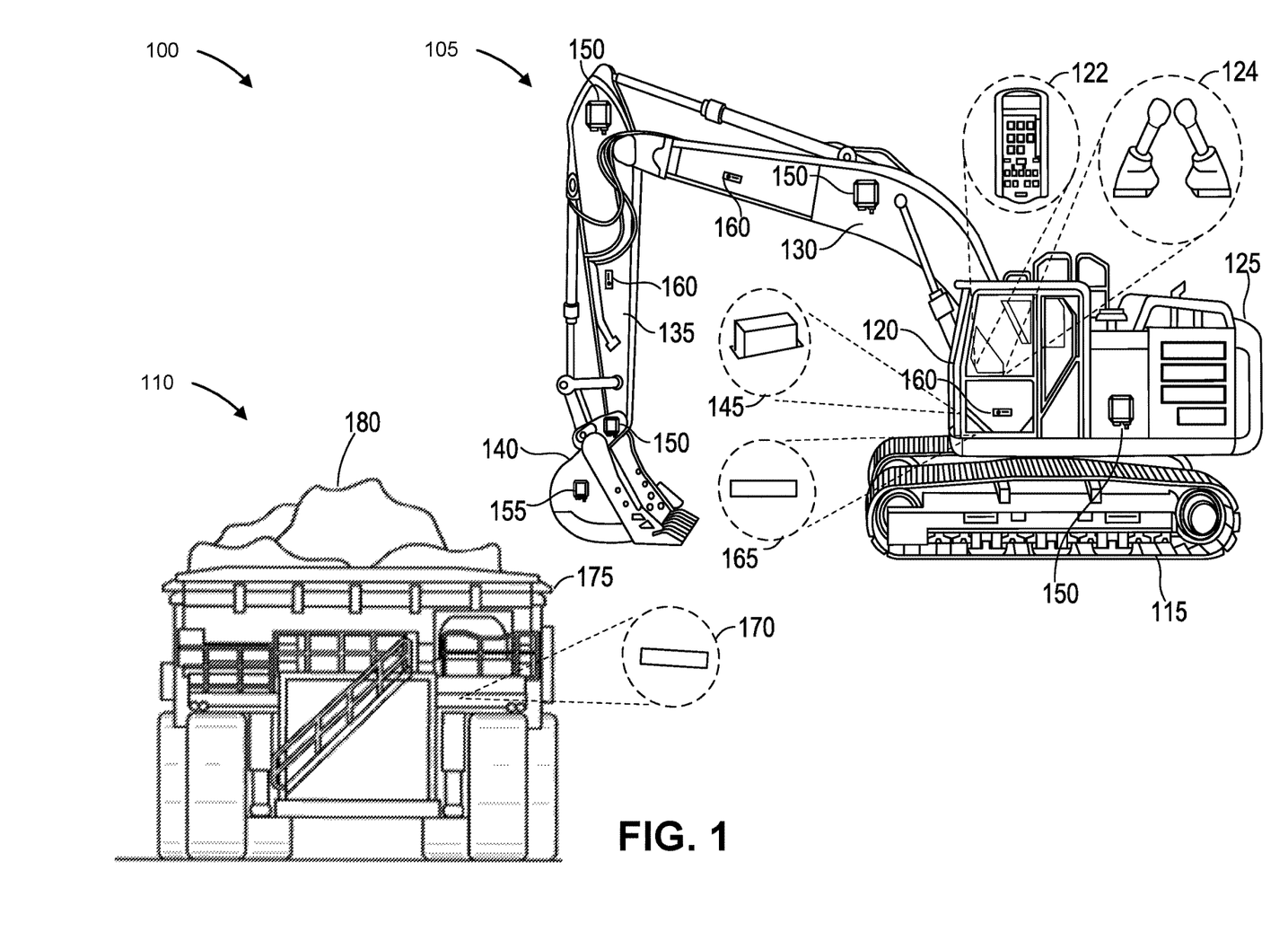
FIG. 1 is a diagram of an example implementation described herein.

FIG. 1 is a diagram of an example implementation 100 described herein. Example implementation 100 of FIG. 1 includes a machine 105 and a machine 110. As shown in FIG. 1, machine 105 is embodied as a loading machine, such as an excavator. Alternatively, machine 105 may be another type of loading machine such as, for example, a dozer, a wheel loader, and/or a similar machine. As shown in FIG. 1, machine 110 is embodied as a hauling machine such as a mining truck, a haul truck, a dump truck, and/or a similar machine. In some examples, machine 105 may load (or move) material into machine 110 (e.g., into a truck bed of machine 110).

As shown in FIG. 1, machine 105 includes ground engaging members 115, an operator cabin 120, and a machine body 125. Ground engaging members 115 may be configured to propel machine 105. Ground engaging members 115 may include tracks (as shown in FIG. 1). Alternatively, ground engaging members 115 may include wheels, rollers, and/or the like. Ground engaging members 115 may be mounted on machine body 125 and are driven by one or more engines and drive trains (not shown).

Operator cabin 120 is supported by machine body 125 and a rotating frame (not shown). Operator cabin 120 includes an integrated display 122 and operator controls 124, such as, for example, integrated joystick. Operator controls 124 may include one or more input components to generate signals that control movement of machine 105.

For an autonomous machine, operator controls 124 may not be designed for use by an operator and, rather, may be designed to operate independently from an operator. In this case, for example, operator controls 124 may include one or more input components that provide an input signal for use by another component without any operator input. Machine body 125 is mounted on the rotating frame (not shown).

As shown in FIG. 1, machine 105 includes a boom 130, a stick 135, and a tool 140. Boom 130 is pivotally mounted at a proximal end of machine body 125, and is articulated relative to machine body 125 by one or more fluid actuation cylinders (e.g., hydraulic or pneumatic cylinders), electric motors, and/or other electro-mechanical components. Stick 135 is pivotally mounted at a distal end of boom 130 and is articulated relative to boom 130 by the one or more fluid actuation cylinders, electric motors, and/or other electro-mechanical components. Tool 140 is mounted at a distal end of stick 135 and may be articulated relative to stick 135 by the one or more fluid actuation cylinders, electric motors, and/or other electro-mechanical components. Tool 140 may be a bucket (as shown in FIG. 1) or any other tool that may be mounted on stick 135.

As shown in FIG. 1, machine 105 includes a controller 145 (e.g., an electronic control module (ECM)), one or more inertial measurement units (IMUs) 150 (referred to herein individually as "IMU 150," and collectively referred to collectively as "IMUs 150"), a load sensor device 155, one or more stereo camera devices 160 (referred to herein individually as "stereo camera device 160," and collectively referred to collectively as "stereo camera devices 160"), and a wireless communication component 165.

Controller 145 may control and/or monitor operations of machine 105. For example, controller 145 may control and/or monitor the operations of machine 105 based on signals from operator controls 124, from IMUs 150, from payload sensor device 155, and/or from stereo camera device 160.

IMU 150 includes one or more devices that are capable of receiving, generating, storing, processing, and/or providing signals indicating a position and orientation of a component, of machine 105, on which the IMU 150 is installed. For example, the IMU 150 may include one or more accelerometers and/or one or more gyroscopes. The one or more accelerometers and/or the one or more gyroscopes generate and provide signals that can be used to determine a position and/or an orientation of the IMU 150 relative to a frame of reference and, accordingly, a position and/or an orientation of the component. As shown in FIG. 1, IMUs 150 are installed at different positions on components or portions of machine 105, such as, for example, on operator cabin 120, boom 130, stick 135, and tool 140.

Load sensor device 155 may include one or more sensor devices that are capable of sensing a mass (or weight) of material (e.g., material loaded in tool 140) and generating a signal indicating the mass. Load sensor device 155 may include a strain gauge, a piezoelectric sensor, a pressure sensor, a pressure transducer, and/or a similar sensor device. As shown in FIG. 1, load sensor device 155 may be installed on tool 140.

Stereo camera device 160 may include one or more sensor devices that are capable of obtaining data that may be used (e.g., by controller 145) to generate a three-dimensional graphical representation of an area associated with machine 105. As an example, stereo camera device 160 may obtain images of the area associated with machine 105. As shown in FIG. 1, stereo camera devices 160 are installed at different positions on components or portions of machine 105, such as, for example, on operator cabin 120, boom 130, and stick 135. As an alternative, or in addition to stereo camera devices 160, machine 105 may include light detection and ranging (LIDAR) devices, perception sensors, and/or similar devices.

Wireless communication component 165 may include one or more devices that are capable of communicating with one or more other machines (e.g., machine 110) and/or one or more devices, as described herein. Wireless communication component 165 may include a transceiver, a separate transmitter and receiver, an antenna, and/or the like. Wireless communication component 165 may communicate with the one or more machines using a short-range wireless communication protocol such as, for example, BLUETOOTH® Low-Energy, BLUETOOTH®, Wi-Fi, near-field communication (NFC), Z-Wave, ZigBee, Institute of Electrical and Electronics Engineers (IEEE) 802.154, and/or the like.

Additionally, or alternatively, wireless communication component 165 may communicate with the one or more machines via a network that includes one or more wired and/or wireless networks, such as, for example, a wireless local area network (LAN), a cellular network (e.g., a long-term evolution (LTE) network, a code division multiple access (CDMA) network, a 3G network, a 4G network, a 5G network, or another type of cellular network), a public land mobile network (PLMN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

As shown in FIG. 1, machine 110 includes wireless communication component 170 and a truck bed 175. Wireless communication component 170 may be similar to wireless communication component 165 described above. Truck bed 175 may be used to receive material 180 (e.g., loaded into truck bed 175 using tool 140 of machine 105). Material 180 may include ground material (e.g., material obtained from earth).

As indicated above, FIG. 1 is provided as an example. Other examples may differ from what was described in connection with FIG. 1.

Figure 2:
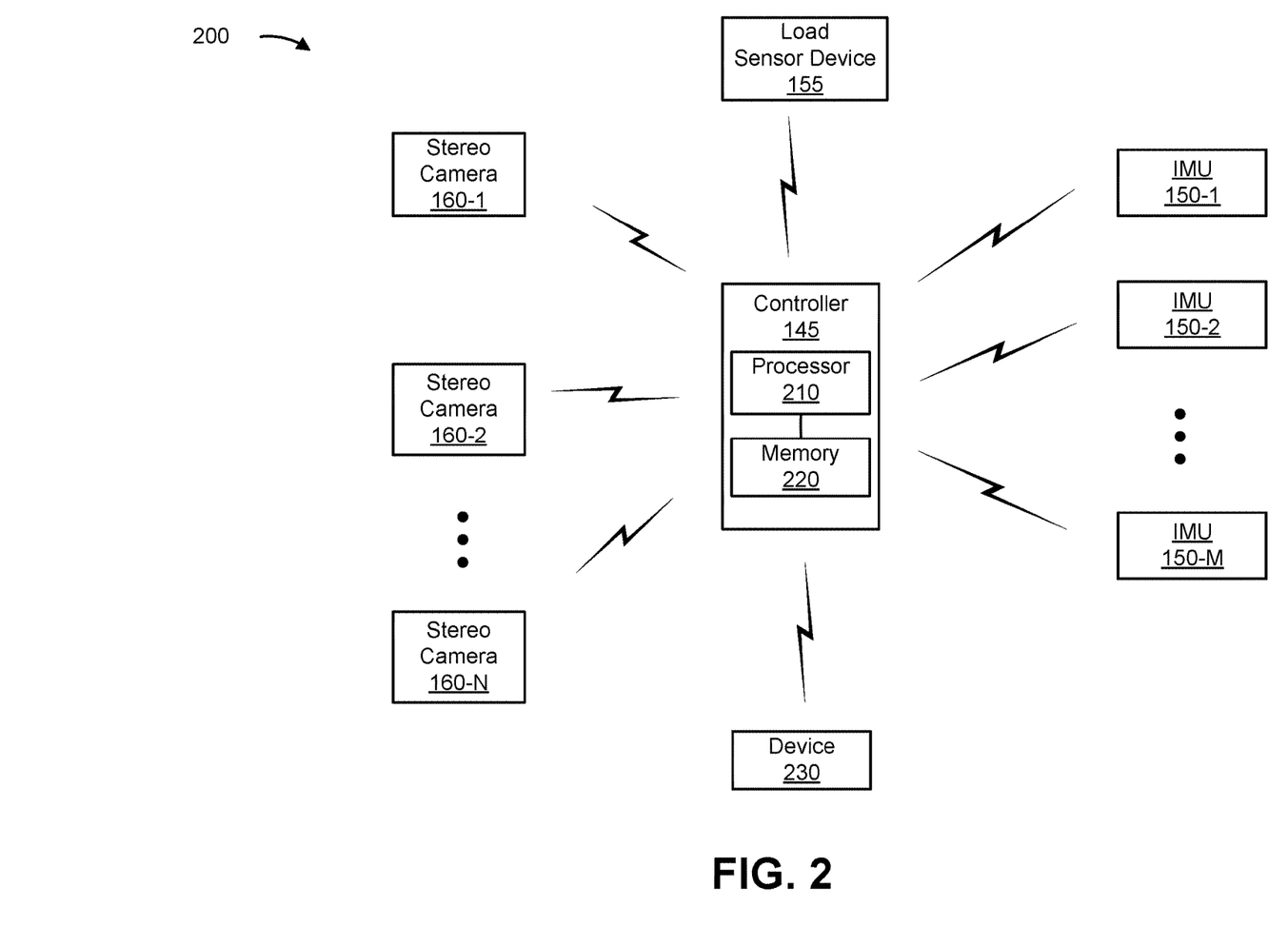
FIG. 2 is a diagram of an example system, described herein, that may be implemented in association with the machine of FIG. 1.

FIG. 2 is a diagram of an example system 200, described herein, that may be implemented in association with the machine of FIG. 1 (e.g., machine 105). As shown in FIG. 2, system 200 includes controller 145, one or more IMUs 150 (e.g., IMUs 150-1 to 150-M (M≥1)), load sensor device 155, stereo camera devices 160 (e.g., stereo camera devices 160-1 to 160-N (N≥1)), and device 230. As an alternative, or in addition to stereo camera devices 160, system 200 may include LIDAR devices, perception sensors, and/or similar devices.

Controller 145 may include one or more processors 210 (referred to herein individually as "processor 210," and collectively as "processors 210"), and one or more memories 220 (referred to herein individually as "memory 220," and collectively as "memories 220"). A processor 210 is implemented in hardware, firmware, and/or a combination of hardware and software. Processor 210 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. A processor 210 may be capable of being programmed to perform a function.

Memory 220 includes a random-access memory (RAM), a read only memory (ROM), and/or another type of dynamic or static storage device (e.g., a flash memory, a magnetic memory, and/or an optical memory) that stores information and/or instructions for use by a processor 210 to perform a function. For example, when performing a function, controller 145 (e.g., using a processor 210 and a memory 220) may obtain data from one or more IMUs 150, load sensor device 155, and/or stereo camera devices 160 and may determine, in real time or near real time, a volume and/or a density of material 180 moved by or to be moved by machine 105.

IMU 150 may be configured to transmit pose information to controller 145 to enable controller 145 to determine a volume of material 180. The pose information may include information regarding a position and/or an orientation of one or more portions of machine 105. For example, the pose information may include information identifying a swing angle of operator cabin 120, an angle of boom 130, and/or an angle of stick 135.

IMU 150 may be configured to transmit the pose information to controller 145 periodically (e.g., every second, every minute, upon occurrence of a trigger, and/or the like). In some examples, IMU 150 may be preconfigured with a period of time for transmitting the pose information. Alternatively, the period of time for transmitting the pose information may be determined by an operator associated with machine 105. Alternatively, the period of time for transmitting the pose information may be determined by controller 145 (e.g., based on historical pose transmission data regarding machine 105).

The historical pose transmission data may include historical data regarding periods of time for transmitting the pose information, frequency of movements of machine 105, and/or similar information. In some instances, IMU 150 may be configured to transmit the pose information to controller 145 based on requests from controller 145. For instance, controller 145 may transmit a request for the pose information based on detecting a movement of machine 105, based on a request for the pose information from an operator of machine 105, and/or based on a request to determine the volume of material 180 and/or the density of material 180.

Load sensor device 155 may be configured to transmit load information to controller 145 to enable controller 145 to determine the density of material 180. The load information may include information identifying a weight and/or a mass of material 180 (e.g., loaded into tool 140 of machine 105 and/or loaded into truck bed 175 of machine 110).

Load sensor device 155 may be configured to transmit the load information to controller 145 periodically (e.g., every second, every minute, upon occurrence of a trigger, and/or the like). In some examples, load sensor device 155 may be preconfigured with a period of time for transmitting the load information. Alternatively, the period of time for transmitting the load information may be determined by an operator associated with machine 105. Alternatively, the period of time for transmitting the load information may be determined by controller 145 (e.g., based on historical load transmission data regarding machine 105).

The historical load transmission data may include historical data regarding periods of time for transmitting the load information and/or frequency of movements of machine 105. Load sensor device 155 may be configured to transmit the load information to controller 145 based on requests from controller 145. For instance, controller 145 may transmit a request for the load information based on receiving a request to determine the density, based on detecting a movement of machine 105 (e.g., based on information from IMU 150), and/or based on a request for the load information.

Stereo camera device 160 may configured to obtain image data and transmit the image data to controller 145 to enable controller 145 to determine the volume and/or the density of material 180. The image data may include images of an area associated with machine 105 (e.g., an area surrounding machine 105). The image data may identify areas of interest associated with machine 105. The areas of interest may include a location of tool 140 of machine 105, a location of truck bed 175 of machine 110, and/or a location of a pile of material 180.

Stereo camera device 160 may configured to transmit the image data to controller 145 periodically (e.g., every second, every minute, upon occurrence of a trigger, and/or the like). In some examples, stereo camera device 160 may be preconfigured with a period of time for transmitting the image data. Alternatively, the period of time for transmitting the image data may be determined by an operator associated with machine 105. Alternatively, the period of time for transmitting the image data may be determined by controller 145 (e.g., based on historical image data regarding machine 105).

The historical image transmission data may include historical data regarding periods of time for transmitting the image data, frequency of movements of machine 105, frequency of requests for determining the volume and/or the density. In some examples, stereo camera device 160 may be configured to transmit the image data to controller 145 based on requests from controller 145. For instance, controller 145 may transmit a request for the image data based on detecting a movement of machine 105 (e.g., a movement associated with moving the material into truck bed 175 of machine 110), based on a request for the image data, and/or based on a request to determine the volume of material 180 and/or the density of material 180.

In some examples, stereo camera device 160 may perform one or more object detection (or object recognition) operations to identify the areas of interest in the image data. For instance, controller 145 may provide, to stereo camera device 160, information identifying the areas of interest and stereo camera device 160 may perform the one or more object detection operations to identify the areas of interest in the image data.

Device 230 may include one or more devices that may monitor a volume and/or a density of material moved by different machines (e.g., machine 105, machine 110, and/or other machines). Devices 230 may include a server device (e.g., a host server, a web server, an application server, and/or the like.), a computer (e.g., a laptop, a desktop, and/or the like), a user device (e.g., a mobile device, a laptop, and/or the like), a cloud device, and/or the like. In some examples, device 230 may be included in machine 110.

Controller 145 may obtain data from one or more IMUs 150, load sensor device 155, and/or stereo camera devices 160 to determine a volume of material 180 and/or a volume of material 180 moved by machine 105, as described in more detail below. In some examples, controller 145 may receive a request to determine a volume (and/or a density) of material moved and/or to be moved by machine 105 (e.g., a volume and/or a density of material 180 loaded into truck bed 175, a volume and/or a density of material 180 in tool 140, and/or a volume and/or a density of material 180 in a pile within a threshold distance of machine 105 and/or machine 110).

Controller 145 may receive the request from an operator of machine 105, an operator of machine 110, and/or from a user of device 230. For example, the operator of machine 105 may use integrated display 122 to submit the request and controller 145 may receive the request from integrated display 122. Alternatively, the operator of machine 110 may transmit the request via wireless communication component 170 (of machine 110) and controller 145 may receive the request via wireless communication component 165 (of machine 105). Alternatively, controller 145 may receive the request via wireless communication component 165 (of machine 105) from device 230. In some examples, controller 145 may provide a user interface (e.g., graphical user interface for display) and the request may be submitted using the user interface.

In some examples, controller 145 may receive (as part of the request) information identifying an area of interest from a plurality of candidate areas of interest. An area of interest may correspond to a location, an area, a region, and/or similar geographical information. The plurality of candidate areas of interest may include locations on the machine and external to machine 105. For example, the plurality of candidate areas of interest may include truck bed 175 of machine 110, tool 140 of machine 105, and/or a pile of material 180 within a threshold distance of machine 105 and/or machine 110. Accordingly, the information identifying the area of interest (hereinafter "area of interest information") may identify truck bed 175, tool 140, and/or the pile of material 180.

The area of interest information may include information identifying machine 110 (e.g., a type of machine 110 and/or dimensions machine 110), information identifying truck bed 175 (e.g., a type of truck bed 175, dimensions of truck bed 175, and/or a location of truck bed 175 with respect to machine 110), information identifying tool 140 (e.g., a type of tool 140 and/or dimensions of tool 140), and/or information identifying the pile of material 180 (e.g., a location of the pile of material 180 (e.g., with respect to machine 105 and/or machine 110), dimensions of the pile of material 180, and a shape of the pile of material 180).

In some examples, controller 145 may obtain from one or more memories associated with machine 105 (e.g., memory 220) the information identifying truck bed 175 based on the information identifying machine 110. Controller 145 may obtain, from the one or more memories, the information identifying tool 140 based on the request identifying tool 140 as the area of interest.

In some examples, based on receiving the request, controller 145 may obtain data associated with the area of interest identified in the request. For example, based on receiving the request, controller 145 may cause one or more stereo camera devices 160 to be directed towards the area of interest and obtain data (e.g., images) including the area of interest. The images may identify material 180 located at the area of interest. In some examples, controller 145 may cause the images to be stored in the one or more memories.

In some instances, controller 145 may cause the one or more stereo camera devices 160 to obtain the images each time a movement of machine 105 (e.g., a movement associated with machine 105 moving material 180) is detected. Controller 145 may detect the movement of machine 105 based on information obtained from one or more IMUs 150.

In some implementations, machine 110 may transmit, via wireless communication component 170, arrival information indicating that machine 110 will be arriving to obtain material 180 (from machine 105), indicating an estimated time of arrival, and/or indicating an anticipated location of machine 110 (e.g., with respect to machine 105) upon arrival. Alternatively, the arrival information may indicate that machine 110 has arrived (and is ready to obtain material 180 from machine 105) and indicate an actual location of machine 110 (e.g., with respect to machine 105).

Controller 145 may receive the arrival information via wireless communication component 165 and cause the one or more stereo camera devices 160 to obtain the images based on the arrival information. For example, controller 145 may cause the one or more stereo camera devices 160 to obtain, at the estimated time, images including the anticipated location or to obtain, based on receiving the arrival information, images including the actual location.

Controller 145 (and/or the one or more stereo camera devices 160) may analyze the data (e.g., the images) to identify the area of interest. For example, controller 145 (and/or the one or more stereo camera devices 160) may analyze the images using one or more object detection techniques (e.g., a Single Shot Detector (SSD) technique, a You Only Look Once (YOLO) technique, and/or the like) to identify the area of interest. In some examples, controller 145 may process the images using one or more image processing techniques prior to controller 145 analyzing the image. For example, controller 145 may combine the images, using the one or more image processing techniques, prior to controller 145 analyzing the images.

In some examples, the arrival information may indicate that one or more identification elements (e.g., one or more machine-readable optical markers) are provided with truck bed 175 (e.g., located at one or more corners of truck bed 175). The identification elements may enable controller 145 (and/or the one or more stereo camera devices 160) to identify truck bed 175 during an object detection operation performed by controller 145 (and/or the one or more stereo camera devices 160) on the images. Alternatively, controller 145 (and/or the one or more stereo camera devices 160) may analyze the images using the one or more object detection techniques (e.g., discussed above) to identify truck bed 175 without using the identification elements.

Controller 145 may generate a three-dimensional (3D) graphical representation based on the images. For example, as result of identifying the area of interest in the data (e.g., the images), controller 145 may generate the 3D graphical representation. The 3D graphical representation may represent an area surrounding machine 105 (or a portion of the area surrounding machine 105) that includes the area of interest. In this regard, the 3D graphical representation may enable controller 145 to determine 3D characteristics of the area surrounding machine 105, including 3D characteristics of the area of interest (e.g., a volume of the area of interest).

Controller 145 may generate a disparity map based on the images. Controller 145 may generate the disparity map using one or more data processing techniques (e.g., one or more data processing techniques for generating disparity maps). Controller 145 may generate the 3D graphical representation based on the disparity map using one or more image processing techniques (e.g., for generating 3D graphical representations based on a disparity map). As an example, the 3D graphical representation may include a 3D point cloud.

Controller 145 may determine a position and/or an orientation of one or more portions of machine 105. For example, controller 145 may obtain the pose information from one or more IMUs 150, in a manner similar to the manner described above. Controller 145 may determine the position and/or the orientation of the one or more portions of machine 105 based on the pose information. For example, controller 145 may determine a swing angle of operator cabin 120, an angle of boom 130, and/or an angle of stick 135 based on the pose information.

Controller 145 may determine coordinates of the area of interest (e.g., coordinates of material 180 at the area of interest) with respect to machine 105 based on the position and/or the orientation of the one or more portions. For example, controller 145 may determine the coordinates of the area of interest with respect to a particular portion of machine 105. For instance, controller 145 may consider the particular portion of machine 105 as a central point of the 3D graphical representation (e.g., coordinates "0,0,0" of the 3D graphical representation) and the coordinates of the area of interest may correspond to 3D coordinates, of the 3D graphical representation, with respect to the central point.

Controller 145 may identify, based on the coordinates, a portion of the 3D graphical representation (hereinafter referred to as "3D portion") corresponding to the area of interest. In some examples, the 3D portion may correspond to truck bed 175 including material 180. Additionally, or alternatively, the 3D portion may correspond to tool 140 including material 180. Additionally, or alternatively, the 3D portion may correspond to the pile of material 180. Controller 145 may identify the 3D portion to preserve computing resources that would have otherwise been used to process an entirety of the 3D graphical representation to determine the volume of material 180 at the area of interest.

Controller 145 may determine a volume of the 3D portion using one or more computational models, one or more computational algorithms, and/or other machine algorithms that may be used to determine a volume of a 3D graphical representation. In some instances, the 3D portion may correspond to the pile of material 180. Accordingly, the volume of the 3D portion may correspond to the volume of material 180.

Controller 145 may determine the volume of the 3D portion in real time or near real time. In this regard, controller 145 may determine the volume of the 3D portion periodically (e.g., every second, every minute, and/or similar period of time). Additionally, or alternatively, controller 145 may determine the volume of the 3D portion each time a movement of machine 105 (e.g., a movement associated with machine 105 moving material 180) is detected. Controller 145 may detect the movement of machine 105 as described above.

Because controller 145 may determine the volume of the 3D portion in real time, the volume of the 3D portion may change over a period of time. For example, assume the area of interest is truck bed 175. At a first time, prior to machine 105 loading any material 180 into truck bed 175, the volume of the 3D portion may correspond to a volume of truck bed 175 when truck bed 175 is empty.

Assume that machine 105 loads a first portion of material 180 into truck bed 175 after the first time. At a second time (following the first time), the volume of the 3D portion may correspond the volume of truck bed 175 including the first portion of material 180 (e.g., a volume of the first portion of material 180 in addition to the volume of truck bed 175 when truck bed 175), and so on. Controller 145 may store (e.g., in the one or more memories) information identifying the different volumes of the 3D portion over the period of time (e.g., during a work shift).

Controller 145 may determine a volume of material 180 based on the volume of the 3D portion. In some instances, the volume of the 3D portion may correspond to the volume of material 180, as explained above. In some instances, the 3D portion may correspond to truck bed 175 including material 180 (if the area of interest is truck bed 175) or may correspond to tool 140 including material 180 (if the area of interest is tool 140).

Assume that the 3D portion corresponds to truck bed 175 including material 180, controller 145 may determine the volume of material 180 in truck bed 175 based on a previous volume of truck bed 175. As an example, controller 145 may determine the volume of material 180 in truck bed 175 based on a volume of truck bed 175 when truck bed 175 is empty. For example, controller 145 may obtain, from the one or more memories, information identifying the volume of truck bed 175 when truck bed 175 is empty. Controller 145 may determine the volume of material 180 by subtracting the volume of truck bed 175 from the volume of the 3D portion. Controller 145 may determine the volume of material 180 in tool 140 in a manner similar to the manner described above with respect to the volume of material 180 in truck bed 175.

Controller 145 may determine the volume of material 180 in real time or near real time. In this regard, controller 145 may determine the volume of material 180 periodically (e.g., every second, every minute, and/or similar period of time). Additionally, or alternatively, controller 145 may determine the volume of material 180 each time a movement of machine 105 (e.g., a movement associated with machine 105 moving material 180) is detected. Controller 145 may detect the movement of machine 105 as described above.

Controller 145 may perform an action based on the volume of material 180. For example, the action may include controller 145 transmitting information regarding the volume of material 180 to machine 110, to device 230, and/or to another similar recipient. For example, controller 145 may transmit the information regarding the volume using wireless communication component 165.

Additionally, or alternatively, the action may include controller 145 determining a density of material 180. For example, controller 145 may determine the density of material 180 based on the volume of material 180 and a mass of material 180. For instance, controller 145 may determine the density of material 180 based on one or more mathematical operations involving the mass of material 180 and the volume of material 180. In some instances, controller 145 may determine the density of material 180 based on the following formula:

$$p = m/V$$

where p corresponds to the density of material 180, m corresponds to the mass of material 180, and V corresponds to the volume of material 180.

In some examples, controller 145 may determine a density of material 180 in truck bed 175. Controller 145 may obtain information identifying a mass of material 180 in truck bed 175 from machine 110 via wireless communication component 165. For example, controller 145 may transmit, via wireless communication component 165, a request for information identifying the mass of material 180 in truck bed 175 to machine 110 and controller 145 may receive, via wireless communication component 165, the information identifying the mass of material 180 in truck bed 175 from machine 110. In some instances, machine 110 may determine the mass of material 180 based on data from one or more sensor devices associated with truck bed 175. The one or more sensor devices may be similar to load sensor device 155 and may be located at one or more portions of truck bed 175. The data of the one or more sensor devices may identify the mass of material 180 in truck bed 175.

Additionally, or alternatively, controller 145 may receive, via wireless communication component 165, a request to determine the density of material 180 in truck bed 175 (e.g., based on machine 110 receiving the information identifying the volume of material 180). The request may include information identifying the mass of material 180 in truck bed 175 (e.g., obtained from the one or more sensor devices associated with truck bed 175). Controller 145 may determine the density of material 180 based on the mass of material 180 (e.g., identified in the load information) and the volume of material 180.

Additionally, or alternatively, controller 145 may determine a density of material 180 in tool 140. Controller 145 may obtain the load information from load sensor device 155 in a manner similar to the manner described above (with respect to the description of load sensor device 155). The load information may identify the mass of material 180 in tool 140. Controller 145 may determine the density of material 180 (in tool 140) based on the mass of material 180 (in tool 140) and the volume of material 180 (in tool 140) determined above.

Additionally, or alternatively, controller 145 may determine a mass of material 180 in the pile of material 180. In some examples, controller 145 may obtain information identifying a mass of material 180 from a machine that deposited obtained the pile, from a user device of an operator that caused the pile to be obtained, from device 230, and/or other similar sources of information. The machine may provide the information identifying the mass of material 180 in a manner similar to the manner described above with respect to machine 110. In some instances, the mass of material 180 may be predetermined (e.g., by the user device, by device 230, etc.) Controller 145 may determine the density of material 180 (in the pile) based on the mass of material 180 (in the pile) and the volume of material 180 (in the pile) determined above.

In some examples, controller 145 may determine a type of material 180 (e.g., in truck bed 175 and/or in the pile) and may determine the mass of material 180 based on the type of material 180 and the volume of material 180. For example, controller 145 may determine the mass of material 180 based on one or more mathematical operations involving the volume of material 180 and the type of material 180. Additionally, or alternatively, controller 145 may determine the mass of material 180 using one or more computational models, one or more computational algorithms, and/or other machine algorithms that may be used to determine a mass of material based on a volume of the material and a type of the material.

Controller 145 may obtain information identifying the type of material 180 from the operator of machine 105, from the one or more memories, from the operator of machine 110, from a controller of machine 110, from the user of devices 230, and/or from device 230. The type of material 180 may include dirt, rock, mineral, asphalt, and/or other types of material. The mass of material 180 may differ from one type of material 180 to another type of material 180.

Controller 145 may transmit information regarding the density of material 180 (e.g., in truck bed 175, in tool 140, and/or in the pile) to device 230. For example, controller 145 may transmit the information regarding the density of material 180 (and/or the volume of material 180) using wireless communication component 165.

Additionally, or alternatively, the action may include controller 145 automatically causing an update to an operation of machine 105 to improve productivity of machine 105. For example, controller 145 may automatically cause an update to a configuration of machine 105 (e.g., an update of software of machine 105), an update to one or more components of machine 105 (e.g., update a calibration of the one or more components, a replacement of the one or more components, and/or similar update to the one or more components), and/or another similar update.

In some examples, the area of interest information may identify multiple areas of interest. For example, the multiple areas of interest information may identify a combination of (e.g., two or more of) truck bed 175, a truck bed (or a container) of another machine, tool 140, the pile of material 180, and/or another pile of material. Controller 145 may determine, in real time or near real time, a volume (and/or a density) of material at the multiple areas of interest in a manner similar to the manner described above with respect to determining, in real time or near real time, the volume (and/or a density) of material 180.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
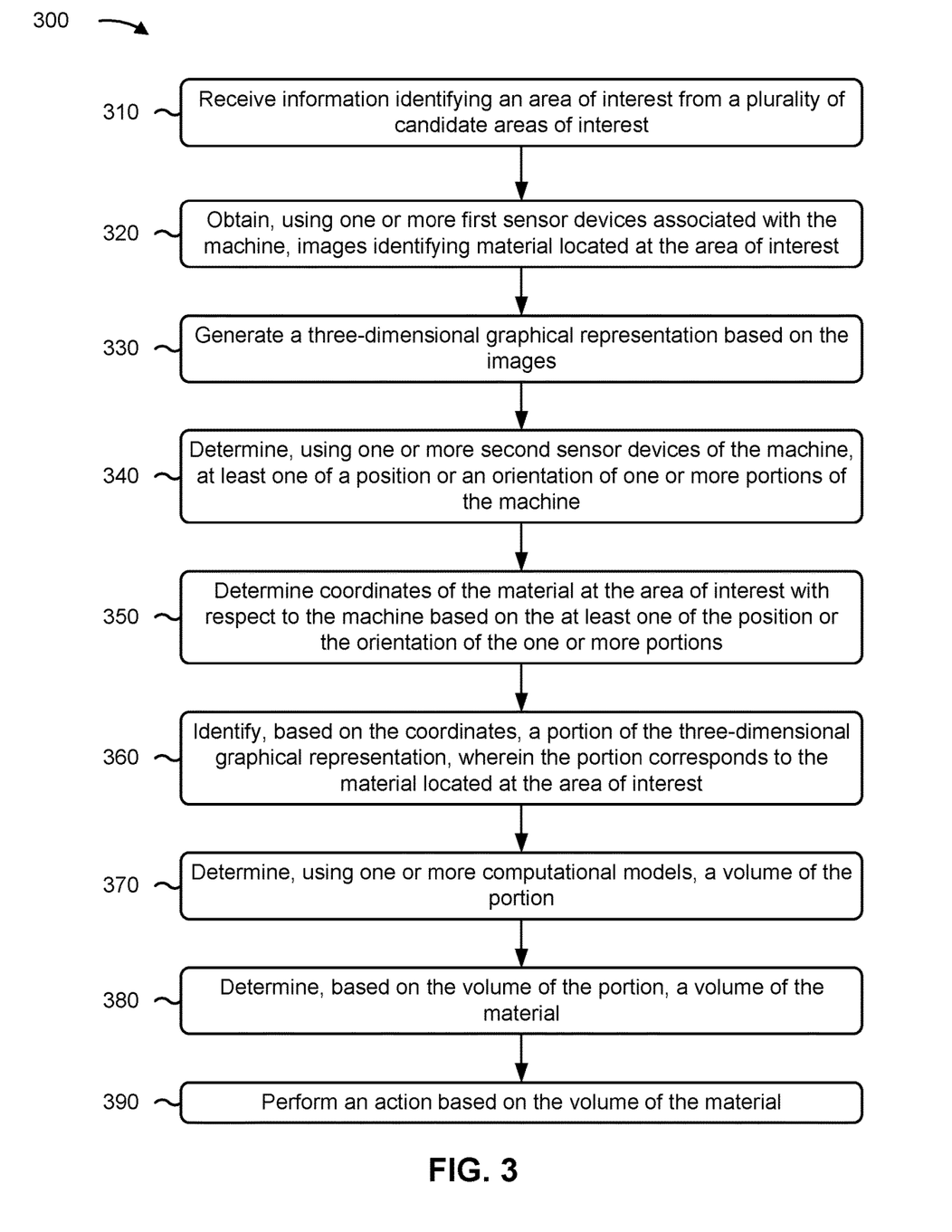
FIG. 3 is a flowchart of an example processes relating to determining material volume and density based on sensor data.

FIG. 3 is a flowchart of an example process 300 associated with determining material volume and density based on sensor data. In some implementations, one or more process blocks of FIG. 3 may be performed by a controller (e.g., controller 145). In some implementations, one or more process blocks of FIG. 3 may be performed by another device or a group of devices separate from or including the controller, such as sensor devices (e.g., stereo cameras 160-1 to 160-M, one or more LIDAR devices, and/or one or more perception sensors), IMUs (e.g., IMU 150-1 to 150-N), wireless communication component 165, and/or a device (e.g., device 230).

As shown in FIG. 3, process 300 may include receiving information identifying an area of interest from a plurality of candidate areas of interest, wherein the plurality of candidate areas of interest include locations on the machine and external to the machine (block 310). For example, the controller may receive information identifying an area of interest from a plurality of candidate areas of interest, wherein the plurality of candidate areas of interest include locations on the machine and external to the machine, as described above. The plurality of candidate areas of interest include locations on the machine and external to the machine.

As further shown in FIG. 3, process 300 may include obtaining, using one or more first sensor devices associated with the machine, images identifying material located at the area of interest (block 320). For example, the controller may obtain, using one or more stereo camera devices associated with the machine, images identifying material located at the area of interest, as described above.

As further shown in FIG. 3, process 300 may include generating a three-dimensional graphical representation based on the images (block 330). For example, the controller may generate a three-dimensional graphical representation based on the images, as described above. The controller may generate a disparity map based on a first image and a second image of the plurality of images; and generate a three-dimensional (3D) point cloud based on the disparity map.

As further shown in FIG. 3, process 300 may include determining, using one or more second sensor devices of the machine, at least one of a position or an orientation of one or more portions of the machine (block 340). For example, the controller may determine, using one or more sensor devices of the machine, at least one of a position or an orientation of one or more portions of the machine, as described above. Determining the at least one of the position or the orientation of the one or more portions of the machine comprises determining at least one of a position or an orientation of an operator cabin of the machine, a stick of the machine, or a boom of the machine.

As further shown in FIG. 3, process 300 may include determining coordinates of the material at the area of interest with respect to the machine based on the at least one of the position or the orientation of the one or more portions (block 350). For example, the controller may determine coordinates of the material at the area of interest with respect to the machine based on the at least one of the position or the orientation of the one or more portions, as described above.

As further shown in FIG. 3, process 300 may include identifying, based on the coordinates, a portion of the three-dimensional graphical representation, wherein the portion corresponds to the material located at the area of interest (block 360). For example, the controller may identify, based on the coordinates, a portion of the three-dimensional graphical representation, wherein the portion corresponds to the material located at the area of interest, as described above. The portion corresponds to the material located at the area of interest.

As further shown in FIG. 3, process 300 may include determining, using one or more computational models, a volume of the portion (block 370). For example, the controller may determine, using one or more computational models, a volume of the portion, as described above.

As further shown in FIG. 3, process 300 may include determining, based on the volume of the portion, a volume of the material (block 380). For example, the controller may determine, based on the volume of the portion, a volume of the material, as described above.

The machine may be a first machine, and process may further comprise identifying, based on the images, a truck bed of a second machine as the area of interest. In some implementations, determining the volume of the material comprises determining a volume of the material moved by the first machine into the truck bed.

As further shown in FIG. 3, process 300 may include performing an action based on the volume of the material (block 390). For example, the controller may perform an action based on the volume of the material, as described above.

The one or more first sensor devices may include at least one of one or more stereo camera devices, one or more LIDAR devices, or one or more perception sensors, and the process may further comprise obtaining, using one or more third sensor devices of the machine, information identifying a mass of the material, and determining a density of the material based on the mass of the material and the volume of the material. Determining the volume of the material may comprise determining, based on the data, a first volume of the truck bed when the truck bed is empty; determining, based on the data, a second volume of the truck bed after the material has been moved into the truck bed; and determining the volume of the material at the area of interest based on a difference between the first volume and the second volume.

In some examples, performing the action comprises transmitting information regarding at least one of the volume or the density to one or more devices that monitor at least one of a volume of material or a density of material moved by the machine.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

This disclosure relates to a controller that determines a volume and/or a density of material located at a plurality of areas of interest (e.g., locations on the machine and external to the machine). The disclosed process for determining a volume and/or a density of material located at a plurality of areas of interest may prevent issues associated with manual measurements of volume and/or density of material. Such manual measurements may waste computing resources that are used to remedy issues associated with the manual measurements being inaccurate (e.g., remedy issues associated with inaccurate changes and/or adjustments to the excavator such as inaccurate changes and/or adjustments to the configuration of the excavator, inaccurate changes and/or adjustments to the components of the excavator, etc.).

The disclosed process may resolve the issues mentioned above with respect to manual measurements. Several advantages may be associated with the disclosed process for determining a volume and/or a density of material located at a plurality of areas of interest. For example, the process may determine the volume and/or the density of the material at locations on and external to the machine (e.g., a bucket of the machine, a truck bed of another machine, and/or a pile of material within a threshold distance of the machine).

Additionally, by determining the volume and/or the density of material using sensor data, the process may prevent manual measurements of the volume and/or the density of the material.

By preventing such manual measurements, the process may preserve computing or machine resources that would have otherwise been used to remedy issues associated with the manual measurements being inaccurate such remedy issues associated with inaccurate changes and/or adjustments to the excavator (e.g., issues associated with inaccurate changes and/or adjustments to the configuration of the excavator, inaccurate changes and/or adjustments to the components of the excavator, etc.).

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method performed by a controller of a machine, the method comprising:
   receiving information identifying an area of interest from a plurality of candidate areas of interest,
     wherein the plurality of candidate areas of interest include locations on the machine and external to the machine;
   obtaining, using one or more first sensor devices associated with the machine, images identifying material located at the area of interest;
   generating a three-dimensional graphical representation based on the images;
   determining, using one or more second sensor devices of the machine, at least one of a position or an orientation of one or more portions of the machine;
   determining coordinates of the material located at the area of interest with respect to the machine based on the at least one of the position or the orientation of the one or more portions of the machine;
   identifying, based on the coordinates of the material located at the area of interest, a portion of the three-dimensional graphical representation,
     wherein the portion of the three-dimensional graphical representation corresponds to a truck bed that includes the material located at the area of interest;
   determining, using one or more computational models, a volume of the portion of the three-dimensional graphical representation;
   determining, based on the volume of the portion of the three-dimensional graphical representation and based on a previous volume of the truck bed, a volume of the material located at the area of interest; and
   performing an action based on the volume of the material located at the area of interest.

2. The method of claim 1, wherein the one or more first sensor devices include at least one of one or more stereo camera devices, one or more light detection and ranging (LIDAR) devices, or one or more perception sensors; and
   wherein the method further comprises:
     obtaining, using one or more third sensor devices of the machine, information identifying a mass of the material located at the area of interest; and
     determining a density of the material based on the mass of the material located at the area of interest and the volume of the material located at the area of interest.

3. The method of claim 2, wherein performing the action comprises:
   transmitting information regarding at least one of the volume of the material located at the area of interest or the density of the material located at the area of interest to one or more devices that monitor at least one of a volume of material or a density of material moved by the machine.

4. The method of claim 1,
   wherein the machine is a first machine; and
   wherein the truck bed is included in a second machine.

5. The method of claim 1, wherein the volume of the material located at the area of interest comprises a volume of the material moved by the machine into the truck bed.

6. The method of claim 1, wherein determining the at least one of the position or the orientation of the one or more portions of the machine comprises:
   determining at least one of a position or an orientation of an operator cabin of the machine, a stick of the machine, or a boom of the machine.

7. The method of claim 1, wherein generating the three-dimensional graphical representation comprises:
   generating a three-dimensional point cloud based on the images.

8. A machine, comprising:
   one or more memories; and
   one or more processors configured to:
     receive information identifying an area of interest from a plurality of candidate areas of interest,
       wherein the plurality of candidate areas of interest include locations on the machine and external to the machine;
     obtain, using one or more first sensor devices associated with the machine, data identifying material located at the area of interest;
     generate a three-dimensional graphical representation of the material based on the data;

determine, using one or more second sensor devices of the machine, at least one of a position or an orientation of one or more portions of the machine;

identify a portion of the three-dimensional graphical representation based on the at least one of the position or the orientation of the one or more portions of the machine, wherein the area of interest is a truck bed, and wherein the portion of the three-dimensional graphical representation corresponds to the material in the truck bed;

determine, using one or more computational models, a volume of the portion of the three-dimensional graphical representation; and determine, based on the volume of the portion of the three-dimensional graphical representation and based on a previous volume of the truck bed, a volume of the material.

9. The machine of claim 8, wherein the one or more first sensor devices include one or more stereo cameras located at the one or more portions of the machine, the one or more portions of the machine including at least one of an operator cabin of the machine, a stick of the machine, or a boom of the machine;

wherein the data includes a plurality of images; and wherein, when generating the three-dimensional graphical representation, the one or more processors are configured to:

generate a disparity map based on a first image and a second image of the plurality of images; and generate a three-dimensional (3D) point cloud based on the disparity map.

10. The machine of claim 8, wherein the one or more first sensor devices include one or more light detection and ranging (LIDAR) devices or one or more perception sensors; and wherein, when generating the three-dimensional graphical representation, the one or more processors are configured to:

generate a three-dimensional (3D) point cloud based on the data.

11. The machine of claim 8, wherein the data is first data; wherein the area of interest is a first area of interest; and wherein the one or more processors are further configured to:

obtain, using the one or more first sensor devices of the machine, second data, wherein the second data identifies a second area of interest of the plurality of candidate areas of interest;

identify, based on the second data, the second area of interest; and determine, based on the second data, a volume of the material at the second area of interest.

12. The machine of claim 8, wherein the one or more processors are further configured to:

transmit information regarding the volume of the material to one or more devices that monitor a volume of material moved by or to be moved by the machine.

13. The machine of claim 8, wherein the truck bed is a portion of another machine.

14. The machine of claim 8, wherein, when determining the volume of the material, the one or more processors are further configured to:

determine the volume of the material based on a difference between the volume of the portion of the three-dimensional graphical representation and the previous volume of the truck bed.

15. A system, comprising:

one or more first sensor devices associated with a machine;

one or more second sensor devices associated with the machine; and a controller, of the machine, configured to:

receive information identifying an area of interest from a plurality of candidate areas of interest, wherein the plurality of candidate areas of interest include locations on the machine and external to the machine;

obtain, using the one or more first sensor devices, data identifying material located at the area of interest;

generate a graphical representation based on the data;

determine, using the one or more second sensor devices, at least one of a position or an orientation of one or more portions of the machine;

identify a portion of the graphical representation based on the at least one of the position or the orientation of the one or more portions of the machine, wherein the portion of the graphical representation corresponds to a truck bed; and determine, based on a volume of the portion of the graphical representation and based on a previous volume of the truck bed, a volume of the material located at the area of interest.

16. The system of claim 15, wherein the controller is further configured to:

transmit information regarding the volume of the material to one or more devices that monitor a volume of material moved by and/or to be moved by the machine.

17. The system of claim 15, wherein the machine is a first machine; and wherein the truck bed is a portion of a second machine and is the area of interest.

18. The system of claim 15, wherein the controller is further configured to:

determine a mass of the material;

determine a density of the material based on the mass of the material and the volume of the material; and transmit information regarding the density to one or more devices that monitor a density of material moved by or to be moved by the machine.

19. The system of claim 18, wherein the machine includes at least one of an operator cabin, a stick, or a boom, and wherein, when determining the at least one of the position or the orientation of the one or more portions of the machine, the controller is further configured to:

determine at least one of a position or an orientation of the at least one of the operator cabin, the stick, or the boom.

20. The system of claim 19, wherein, when identifying the portion of the graphical representation, the controller is configured to:

determine coordinates associated with the area of interest with respect to the machine based on the at least one of the position or the orientation of the at least one of the operator cabin, the stick, or the boom; and identify the portion of the graphical representation based on the coordinates.

* * * * *